United States Patent
Nakata et al.

(10) Patent No.: US 10,235,612 B2
(45) Date of Patent: Mar. 19, 2019

(54) INFORMATION PROCESSING APPARATUS, INFORMATION PROCESSING METHOD, STORAGE MEDIUM, AND IMAGE FORMING APPARATUS FOR CONVERTING DRAWING DATA OF A TRANSPARENT OBJECT THAT DOES NOT OVERLAP ANOTHER DRAWING OBJECT INTO DRAWING DATA OF A DRAWING OBJECT THAT DOES NOT HAVE AN ALPHA CHANNEL AS COLOR INFORMATION

(71) Applicant: CANON KABUSHIKI KAISHA, Tokyo (JP)

(72) Inventors: Hiroaki Nakata, Kawasaki (JP); Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/647,556

(22) Filed: Jul. 12, 2017

(65) Prior Publication Data

US 2018/0032849 A1 Feb. 1, 2018

(30) Foreign Application Priority Data

Jul. 29, 2016 (JP) .................................. 2016-149593
Feb. 10, 2017 (JP) .................................. 2017-023210

(51) Int. Cl.
*G06K 15/02* (2006.01)
*G06K 15/12* (2006.01)

(52) U.S. Cl.
CPC ..... *G06K 15/1861* (2013.01); *G06K 15/1276* (2013.01); *G06K 15/1864* (2013.01)

(58) Field of Classification Search
USPC ....................................................... 358/1.16
See application file for complete search history.

(56) References Cited

U.S. PATENT DOCUMENTS

| | | | | |
|---|---|---|---|---|
| 7,209,258 B1 * | 4/2007 | Markovic | ............. | G06T 11/203 358/1.16 |
| 2008/0309980 A1 * | 12/2008 | Iguchi | ..................... | G06T 11/60 358/1.18 |
| 2009/0279122 A1 * | 11/2009 | Armstrong | ............ | G06F 3/1214 358/1.15 |
| 2017/0249108 A1 * | 8/2017 | Nakata | ................... | G06F 3/1209 |
| 2017/0364317 A1 * | 12/2017 | Nagasaka | ............. | G06F 3/1254 |

FOREIGN PATENT DOCUMENTS

JP 2006-244248 A 9/2006

* cited by examiner

*Primary Examiner* — Ngon B Nguyen
(74) *Attorney, Agent, or Firm* — Venable LLP

(57) ABSTRACT

A processor of an information processing apparatus determines, if a drawing object making up page data of a print job is a transparent object having an alpha channel as color information, whether the transparent object overlaps another drawing object. If the transparent object does not overlap the other drawing object, the processor converts drawing data of the transparent object into drawing data of a drawing object not having an alpha channel as color information. If the transparent object overlaps the other drawing object, the processor does not convert the drawing data of the transparent object into the drawing data of the drawing object not having the alpha channel as color information. Based on the converted drawing data and on the non-converted drawing data, the processor creates PDL data to be output to an image forming apparatus.

15 Claims, 17 Drawing Sheets

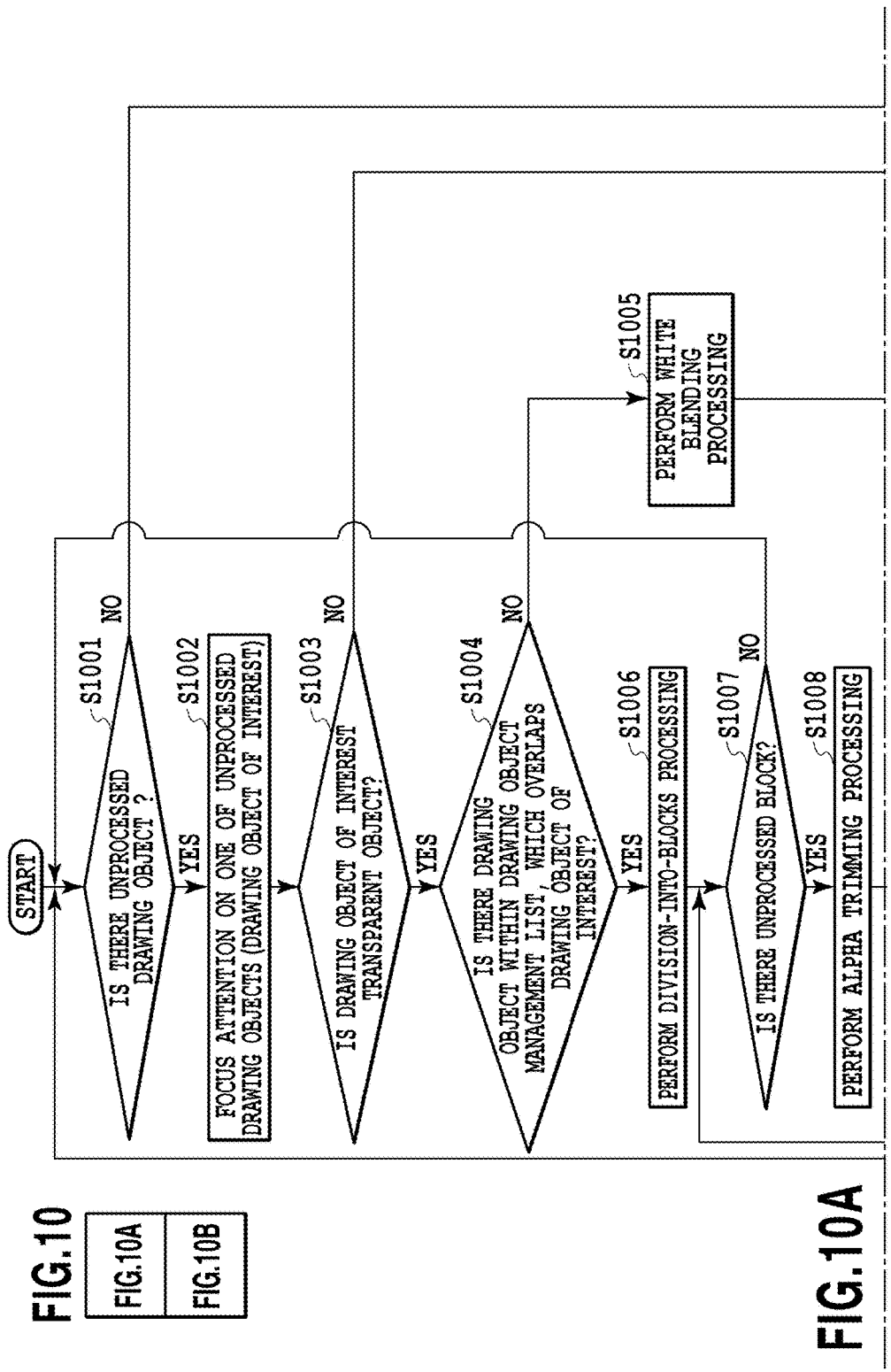

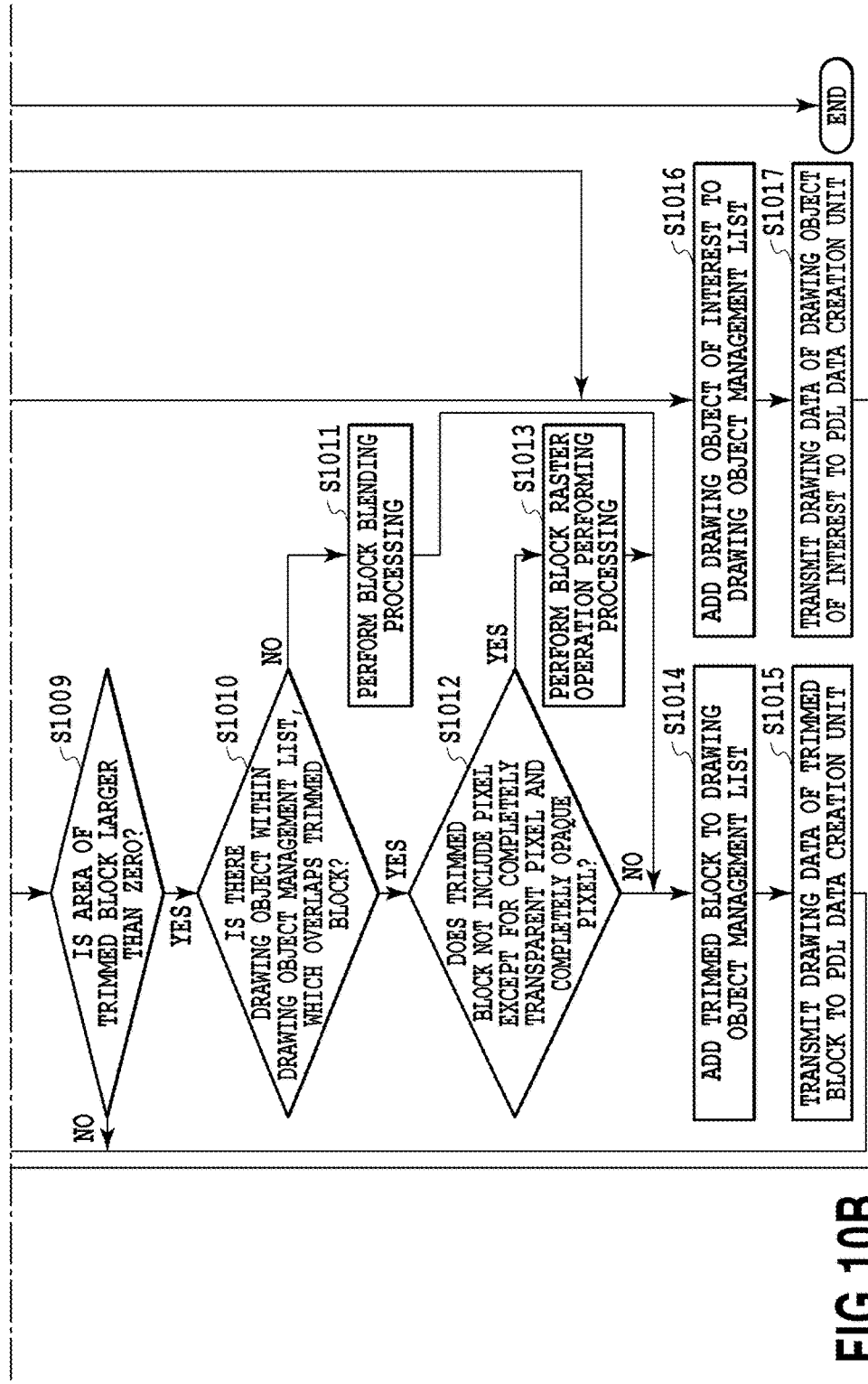

INFORMATION PROCESSING APPARATUS, INFORMATION PROCESSING METHOD, STORAGE MEDIUM, AND IMAGE FORMING APPARATUS FOR CONVERTING DRAWING DATA OF A TRANSPARENT OBJECT THAT DOES NOT OVERLAP ANOTHER DRAWING OBJECT INTO DRAWING DATA OF A DRAWING OBJECT THAT DOES NOT HAVE AN ALPHA CHANNEL AS COLOR INFORMATION

This application claims the benefit of Japanese Patent Application No. 2016-149593 filed Jul. 29, 2016, and No. 2017-023210 filed Feb. 10, 2017, which are hereby incorporated by reference in their entireties.

BACKGROUND OF THE INVENTION

Field of the Invention

The present invention relates to a technique to perform rendering and printing of a transparent object.

Description of the Related Art

As a processing flow to print a document in a printer via a printer driver from an application that runs in the Windows® operating system of Microsoft® Corporation, of Redmond, Wash., United States, there are two processing flows described below, i.e., a GDI (Graphics Device Interface) print path and an XPS (XML Paper Specification) print path. Further, applications that run in the Windows® operating system include an application that outputs drawing data in the GDI format and an application that outputs drawing data in the XPS format, as a drawing command of a printing-target document in a case in which instructions to print a document are given. In the present specification, the application that outputs drawing data in the GDI format is called a GDI application, and the application that outputs drawing data in the XPS format is called an XPS application, in the case in which instructions to print a document are given.

In the GDI print path, by a GDI printer driver (also called a "V3 printer driver"), from drawing data in the GDI format, PDL data (i.e., a print job) that a printer can process is created. On the other hand, in the XPS print path, by a Version 4 printer driver (hereinafter, called a "V4 printer driver") that is supported from Windows® 8, from drawing data in the XPS format, PDL data (i.e., a print job) for a printer is created. In a case in which a print job of a document created by the GDI application is created by using the V4 printer driver, it is necessary to convert the drawing data in the GDI format into drawing data in the XPS format by a Microsoft XPS Document Converter (MXDC).

In a case in which there is a transparent object having a transparency as color information in a printing-target document, the MXDC converts a ROP drawing command to perform drawing by combining a 3-channel RGB image and a mask image into a drawing command of a 4-channel RGBA image having an alpha channel as color information. Then, the V4 printer driver creates a print job by rendering the 4-channel RGBA image having an alpha channel as color information.

In a case in which a print job including a transparent object is printed by a printer, combination (alpha blending) that takes into consideration the color of another object located on the background of the transparent object is performed in the printer. This alpha blending has such a problem that a large amount of memory is used and much time is taken. As a technique to solve this problem, Japanese Patent Laid-Open No. 2006-244248 has disclosed a technique to perform alpha blending processing efficiently by using a table that describes the alpha channel.

Further, in a case in which the number of transparent objects included in a print job is large, there is such a problem that the method of Japanese Patent Laid-Open No. 2006-244248 also takes much time for processing.

SUMMARY OF THE INVENTION

An object of the present invention is to provide an information processing apparatus that reduces the amount of used memory necessary for alpha blending processing in a printer and that enables high-speed printing processing.

One aspect of the present invention provides an information processing apparatus including an overlap determination unit configured to determine, in a case in which a drawing object making up page data of a print job to be output to an image forming apparatus is a transparent object having an alpha channel as color information, whether the transparent object overlaps another drawing object, and a conversion unit configured to convert, in a case in which the overlap determination unit determines that the transparent object does not overlap the other drawing object, drawing data of the transparent object into drawing data of a drawing object not having an alpha channel as color information.

Further features of the present invention will become apparent from the following description of exemplary embodiments with reference to the attached drawings.

BRIEF DESCRIPTION OF THE DRAWINGS

FIG. 10 is a diagram showing the relationship of FIG. 10A and FIG. 10B.

FIG. 10A and FIG. 10B are flowcharts showing a flow of processing in the second embodiment.

DESCRIPTION OF THE EMBODIMENTS

With reference to the drawings, preferred embodiments of the present invention are explained as examples. The relative arrangement of components, the shapes of apparatuses or devices, and so on, described below are, however, merely exemplary and are not intended to limit the scope of the present invention. It should be understood that a relative arrangement obtained by appropriately changing and improving the embodiments described below, based on the common knowledge of a person in the art, may also fall within the scope of the present invention.

First Embodiment

Configuration of Printing System

Figure 1:
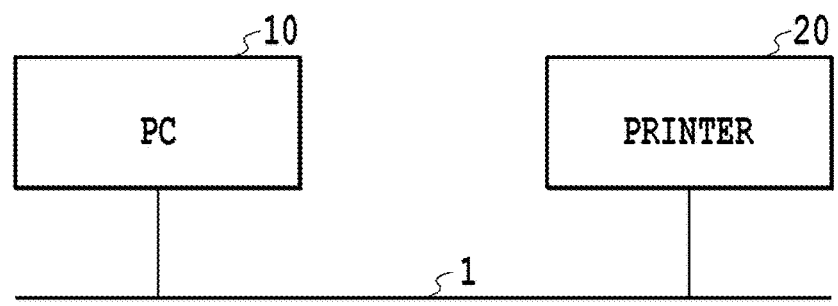
FIG. 1 is a diagram showing a configuration of a printing system in a first embodiment.

FIG. 1 is a diagram showing a configuration of a printing system in the first embodiment. As shown in FIG. 1, the printing system includes an information processing apparatus (hereinafter, described as "a PC") 10 and an image forming apparatus (hereinafter, described as "a printer") 20. The PC 10 and the printer 20 are connected via a local area network (or an LAN) 1, and it is possible to perform transmission and reception of data between the PC 10 and the printer 20. As the LAN 1, it may also be possible to use a wired LAN and a wireless LAN compatible with an Ethernet communication scheme. The configuration in which the PC 10 and the printer 20 are connected is not limited, however, to the LAN 1, and it may also be possible to use another connection configuration, such as Bluetooth® and USB.

Hardware Configuration of PC

Figure 2:
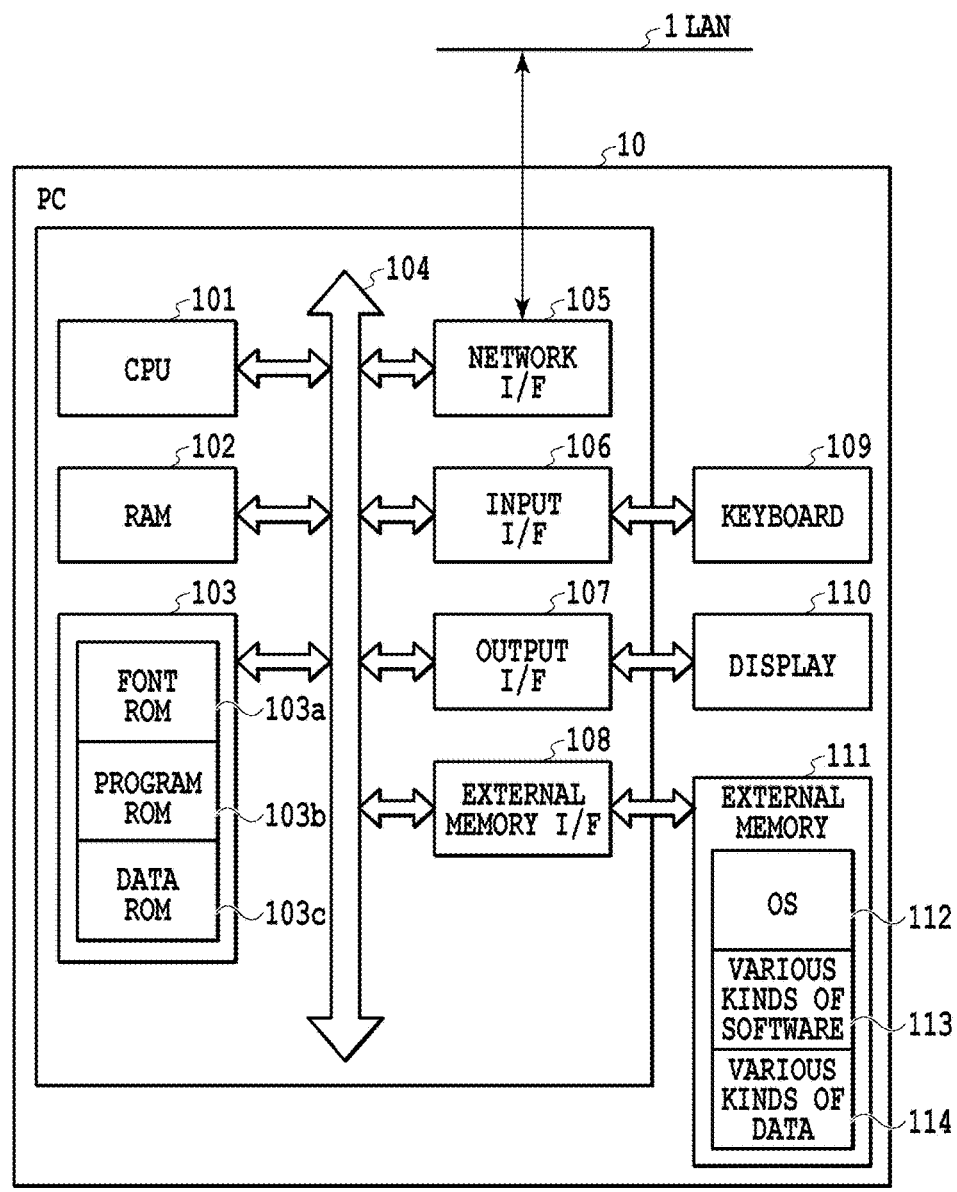
FIG. 2 is a block diagram showing a hardware configuration of a PC in the first embodiment.

FIG. 2 is a block diagram showing a hardware configuration of the PC 10 in the first embodiment. A CPU 101 centrally controls each device connected to a system bus 104 in accordance with programs stored in a RAM 102. The RAM 102 is a storage medium that temporarily stores data and functions as a main memory, a work area, and so on, of the CPU 101. A ROM 103 stores various programs and data, and includes a font ROM 103a that stores various fonts, a program ROM 103b that stores a boot program, a BIOS, and so on, and a data ROM 103c that stores various kinds of data, the font ROM 103a, the program ROM 103b, and the data ROM 103c being distinguished from one another. In the present embodiment, the ROM 103 is used by internally dividing a storage unit, but it may also be possible to configure the font ROM 103a, the program ROM 103b, and the data ROM 103c as physically separate storage units. A network interface (hereinafter, "interface" is abbreviated to "I/F") 105 is connected to the LAN 1 and controls data communication between the PC 10 and an external device. An input I/F 106 controls an input by a user via a keyboard 109, a pointing device (e.g., mouse), and so on (not shown). An output I/F 107 controls an output, such as a display, to a display 110. An external memory I/F 108 controls, for example, access to an external memory 111, for example, such as a hard disk. The external memory 111 is a storage medium that stores an operating system (hereinafter, abbreviated to "OS") 112, various kinds of software 113 in charge of the printing system of the present embodiment, and various kinds of data 114, such as user files and edited files. In the present embodiment, as the OS 112, Microsoft® Windows® 10 is used, but the OS that is used is not limited to this.

Software Configuration of PC

Figure 3:
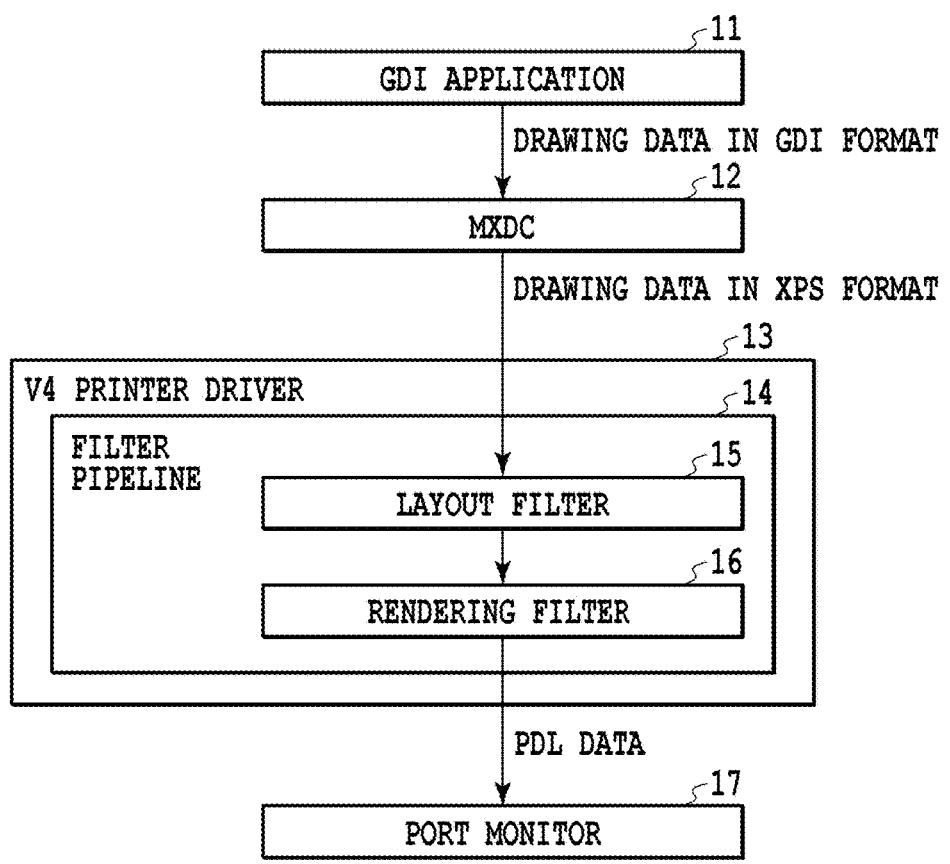
FIG. 3 is a block diagram showing a software configuration of the PC in the first embodiment.

FIG. 3 is a block diagram showing a software configuration of the PC 10 in the present embodiment, and is also a diagram showing software modules relating to rendering processing in a V4 printer driver of software modules that the PC 10 has.

A GDI application 11 is software for a user to create a document and give printing instructions. In a case in which printing instructions are given by a user, the GDI application 11 outputs drawing data in the GDI format to an MXDC 12 as a drawing command of a printing-target document by using an application programming interface (API) of the GDI application 11 of GDI. The MXDC 12 converts the drawing data in the GDI format received from the GDI application 11 into drawing data in the XPS format. Then, the MXDC 12 outputs the converted drawing data in the XPS format to a V4 printer driver 13.

The V4 printer driver sequentially processes the drawing data to create a print job in accordance with a programming model called an XPS print filter pipeline service. Specifically, the V4 printer driver 13 has a filter pipeline 14 including a plurality of linked filters, and the processing by each linked filter is performed in order. That is, a mechanism is such that, by each filter sequentially processing an output of a certain filter as an input of the next linked filter, a print job (PDL data) to be output to the printer 20 is created.

In the present embodiment, the filter pipeline 14 includes two filters: a layout filter 15 that performs layout processing, and a rendering filter 16 that performs rendering processing. The layout filter 15 performs layout processing, such as Nup, to put together a plurality of pages of input drawing data in the XPS format into one page, and outputs drawing data in the XPS format, for which layout has already been performed, obtained by performing the layout processing to the rendering filter 16. The rendering filter 16 converts the input drawing data in the XPS format for which layout has already been performed into PDL data, and outputs the PDL data to a port monitor 17. The processing of a transparent object in the present embodiment, to be described later, is performed by the rendering filter 16.

Figure 7:
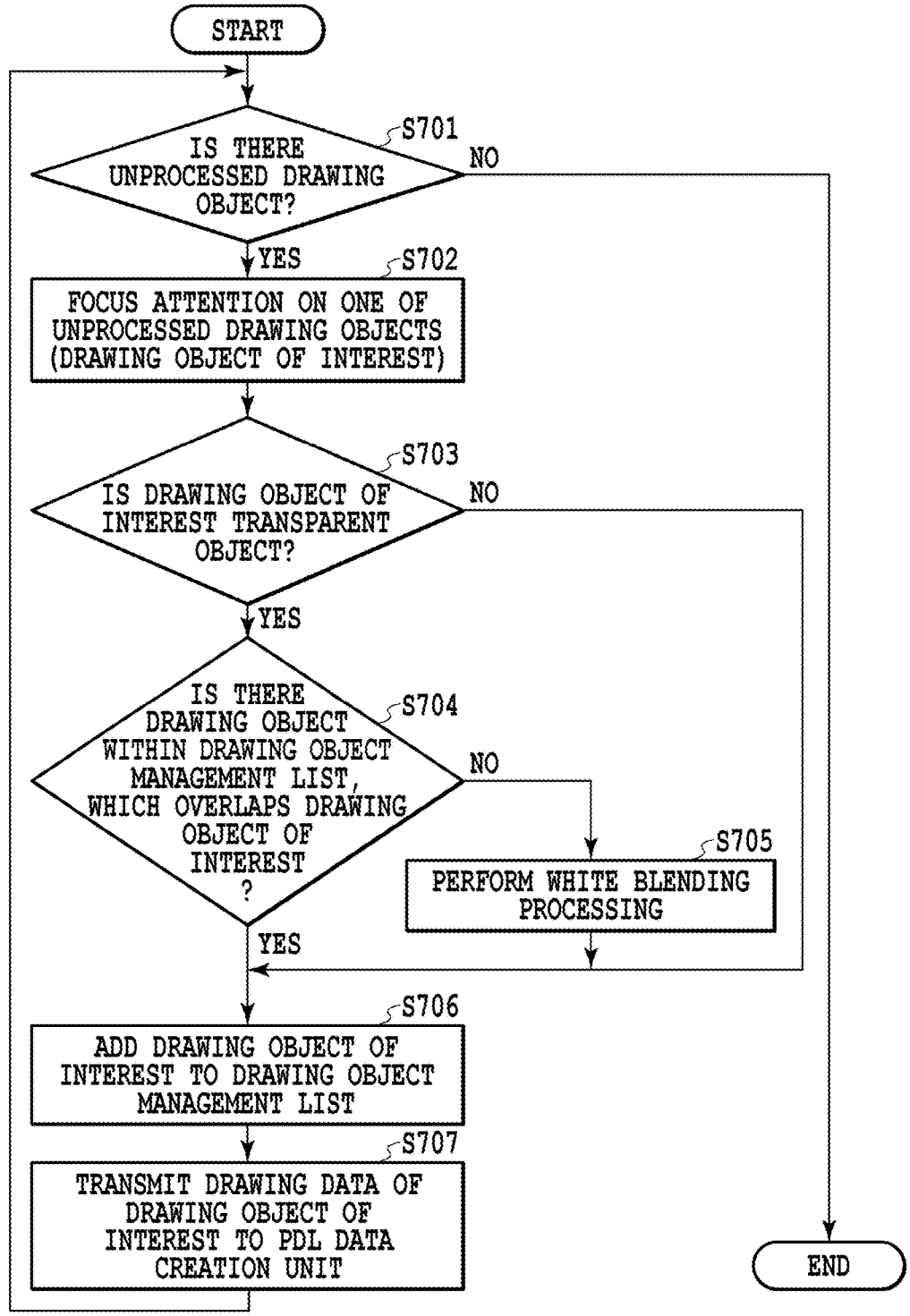
FIG. 7 is a flowchart showing a flow of processing in the first embodiment.

FIG. 3 shows a flow of data in the case in which printing is performed from the GDI application, but the processing of the present invention, to be described later by using FIG. 7, is not limited to printing from the GDI application, and it is also possible to apply the processing to printing from the XPS application. In the case of the XPS application, however, on the occasion that printing instructions are given by a user, the XPS application outputs the drawing data in the XPS format to the V4 printer driver 13 as a drawing command of a printing-target document. The subsequent processing in the V4 printer driver 13 is the same as the printing processing from the GDI application.

Configuration of Rendering Filter

Figure 4:
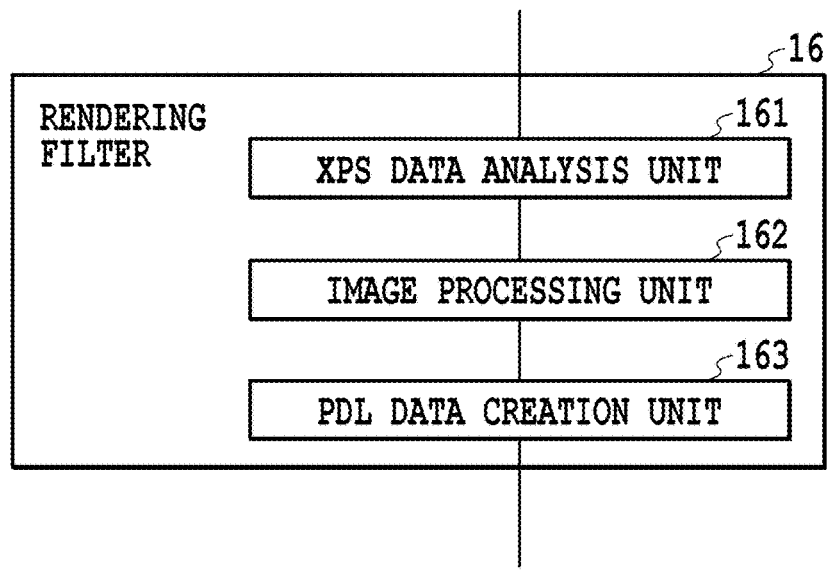
FIG. 4 is a block diagram showing a configuration of a rendering filter in the first embodiment.

FIG. 4 is a block diagram showing a configuration of the rendering filter 16. As shown schematically, the rendering filter 16 includes three components: an XPS data analysis unit 161, an image processing unit 162, and a PDL data creation unit 163.

The XPS data analysis unit 161 analyzes the drawing data in the XPS format for which layout has already been performed and that is input from the layout filer 15, and sequentially outputs drawing data to draw one or a plurality of drawing objects. Here, the drawing object is internally aggregated data to be used to perform rendering of a drawing target. The drawing target in the present embodiment includes an image (a photo and the like), a graphics, and a character. Further, the drawing object may be a transparent object having an alpha channel as color information. Hereinafter, the drawing object to draw an image is called an "image object" and the drawing object to draw a graphics is called a "graphics object".

The image processing unit 162 performs image processing, such as enlargement, reduction, and rotation, for the drawing data of a drawing object input from the XPS data analysis unit 161, and outputs the drawing data for which the image processing has been performed. The processing of a transparent object in the present embodiment, to be described later, is performed by the image processing unit 162.

The PDL data creation unit 163 creates PDL data based on the drawing data of one or more of a plurality of drawing objects input from the image processing unit 162. All of the drawing data in the XPS format for which layout has already been performed, the drawing data of one or more of a plurality of drawing objects, and the PDL data, all of which are handled by these components making up the rendering filter 16, are a set of information on drawing targets, and indicate the order in which the drawing targets are output. For example, in the case in which there are two drawing targets that are output in the different order and that are arranged at the same position, rendering is performed by arranging the drawing target that is later in the order (i.e., that is output later) on the drawing target that is earlier in the order (i.e., that is output earlier). In this case, the drawing targets overlap each other and part or all of the drawing target that is output earlier is covered by the drawing target that is output later.

Transparent Object

Figure 5:
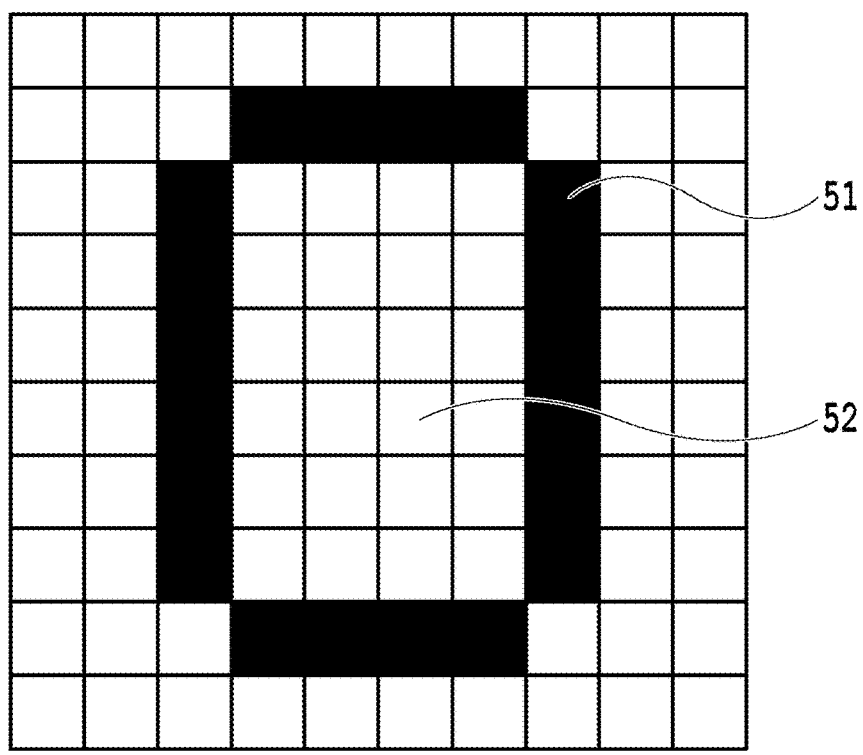
FIG. 5 is a diagram showing a transparent image object in the first embodiment.

FIG. 5 shows a transparent image object (one of the image objects that has, in particular, an alpha channel as color information) as an example of a transparent object in the present embodiment. The transparent image object shown in FIG. 5 is an image in the bitmap format representing a character "o" of the English alphabet. This image consists of pixels painted black (black pixels) and pixels not painted (white pixels), and has 4-channel color information for each pixel. Here, the 4-channel color information is 3-channel RGB color information for representing a color, such as black and white, to which alpha channel (A) color information for specifying a transparency is added. For the pixel value (hereinafter, transparency) of the alpha channel, for example, the transparency in a black pixel 51 in FIG. 5 is 0(%) and the transparency in a white pixel 52 is 100(%). A transparency of 0(%) indicates complete opaqueness and a transparency of 100(%) indicates complete transparency. The transparency such as this is normally specified in the case in which two drawing objects are arranged in the overlap state and rendering is performed so that, in the area in which the transparency of the image that becomes a foreground is high, the image that becomes a background is seen. Alternatively, there is a case in which the transparency is specified so that in the area in which the transparency of the image that becomes a foreground is low, the image that becomes a background is not seen.

Page Data of Print Page

Figure 6:
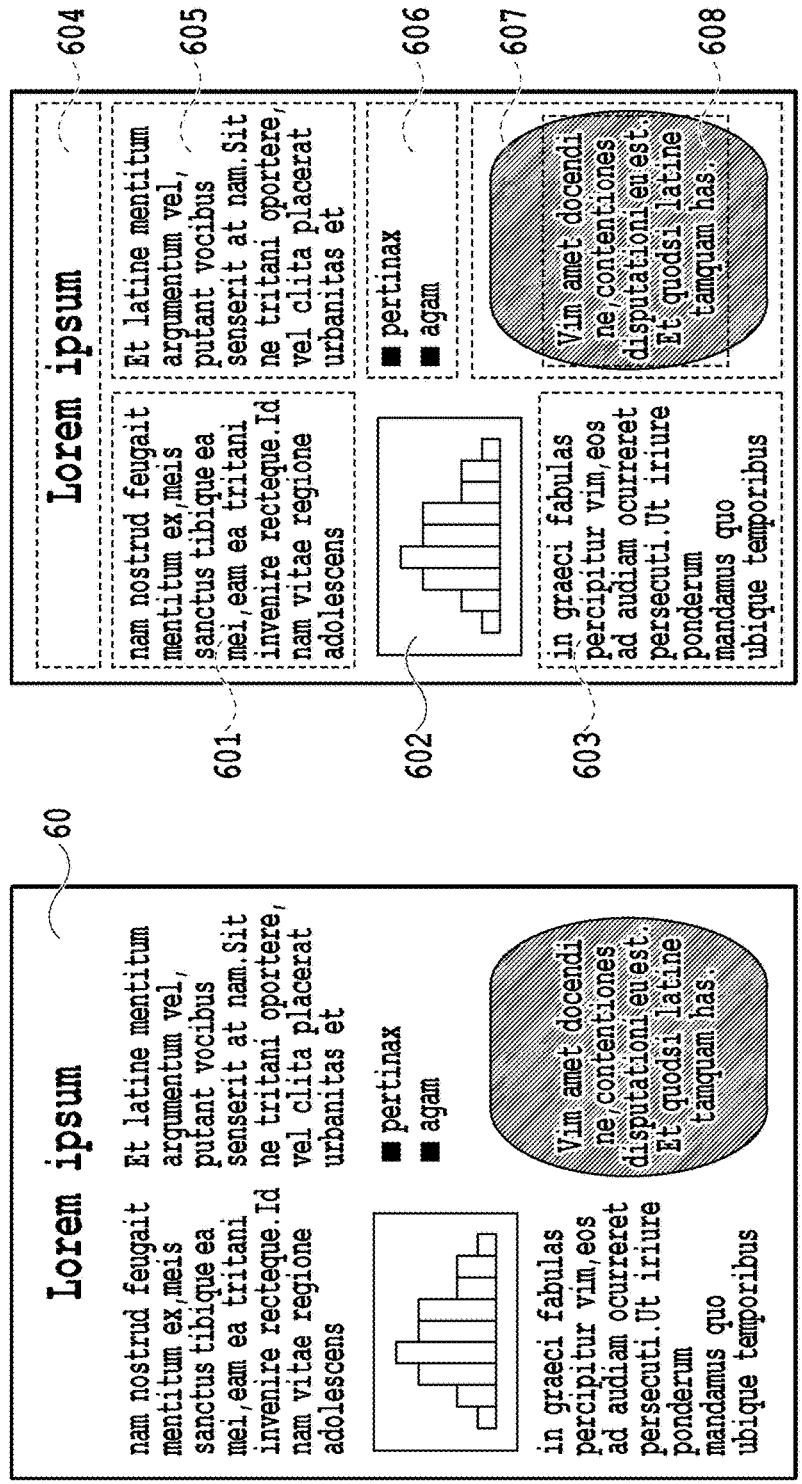
FIG. 6A and FIG. 6B are diagrams showing page data to which the first embodiment is applied.

FIG. 6A is a diagram schematically showing page data 60 of a print page making up a print job to which the present embodiment is applied. FIG. 6B is a diagram explaining drawing objects making up the page data 60 and also showing the page data 60 by dividing the page data 60 into each drawing object corresponding to drawing data that is input sequentially to the image processing unit 162.

Each of symbols 601, 603, 604, 605, 606, and 608 in FIG. 6B indicates a transparent image object. As described above, the transparent image object has 4-channel color information. Here, in the transparent image objects 601, 603, 604, 605, 606, and 608, similar to the transparent image object shown in FIG. 5, it is assumed that the character and the filled portion consist of completely opaque black pixels and the other portion consists of completely transparent white pixels.

Each of symbols 602 and 607 in FIG. 6B indicates a graphics object. As shown in FIG. 6B, the graphics object 602 that draws a graph does not overlap any drawing object, but on the other hand, the graphics object 607 that draws a colored graphics overlaps the transparent image object 608. Here, the case is discussed in which the drawing data of the graphics object 607 is input to the image processing unit 162 and processed earlier than the drawing data of the transparent image object 608. This case requires processing to combine the graphics object 607 and the transparent image object 608 so that the colored graphics based on the graphics object 607 becomes a background, and the transparent image based on the transparent image object 608 becomes a foreground. Such combination processing is one aspect of the processing to combine a transparent image object with another drawing object or a background based on the transparency (alpha value) that is the pixel value of the transparent image object. Such combination processing is called "alpha blending processing".

On the other hand, the transparent image objects 601, 603, 604, 605, and 606 do not overlap another drawing object, but each has the alpha channel. In the case in which the drawing data is converted into PDL data and is transmitted to the printer 20 in the state in which these transparent image objects 601, 603, 604, 605, ad 606 have the alpha channel, it is necessary for the printer 20 to perform the alpha blending processing for a large number of transparent image objects. Consequently, the printing takes time. Because of this, in the present embodiment, by the image processing unit 162 of the PC 10 performing white blending processing (see FIG. 7), to be explained below, the alpha channel is removed from the color information on the transparent object that does not overlap. Due to this, the total number of transparent objects for which the printer 20 performs the alpha blending processing decreases, and, therefore, it is possible to reduce the processing load of the printer 20 and to implement high-speed printing processing.

White Blending Processing

FIG. 7 is a flowchart showing a flow of processing in the present embodiment.

First, at step S701, the image processing unit 162 determines whether there is an unprocessed drawing object among the drawing objects corresponding to the drawing data input from an XPS data analysis unit 151. In the case in which the results of the determination at step S701 are affirmative, the processing advances to step S702, and, on the other hand, in the case in which the results of the determination are negative, the series of processing ends.

At step S702, the image processing unit 162 focuses attention on one drawing object from unprocessed drawing objects and acquires information (the number of channels of color information, the coordinates of the circumscribed rectangle, and so on) on the drawing object on which attention is focused. Hereinafter, a drawing object on which attention is focused is called a "drawing object of interest".

At step S703, the image processing unit 162 determines whether the drawing object of interest is a transparent object. In the case in which the results of the determination at step S703 are affirmative, the processing advances to step S704, and, on the other hand, in the case in which the results of the determination are negative, the processing advances to step S706. The determination of whether the drawing object of interest is a transparent object is performed based on the number of channels of color information input as the attribute of the drawing object of interest. That is, in the case in which the number of channels of color information on the drawing object of interest is four, the drawing object of interest has RGBA color information, and, therefore, it is determined that the drawing object of interest is a transparent object. On the other hand, in the case in which the number of channels of color information on the drawing object of interest is three, the drawing object of interest has RGB color information, and, therefore, it is determined that the drawing object of interest is not a transparent object.

At step S704, the image processing unit 162 searches the drawing object management list and determines whether there is a drawing object within the drawing object management list that overlaps the drawing object of interest. Here, the drawing object management list is a list that is created for each page in order to manage the drawing objects making up page data of a print page, temporarily stored in the RAM 102, and then disposed of. In the drawing object management list, information, such as the identifier of a drawing object and the coordinates of a circumscribed rectangle, is held. Hereinafter, the drawing object management list is abbreviated to the "management list". The determination of whether there is a drawing object that overlaps the drawing object of interest is performed based on the coordinates of the circumscribed rectangle of the drawing object of interest and the coordinates of the circumscribed rectangle of the drawing object registered in the management list. That is, in the case in which the circumscribed rectangle of the drawing object of interest and the circumscribed rectangle of the drawing object registered in the management list overlap, it is determined that the drawing object of interest and the registered drawing object also overlap. Depending on the shape of the drawing object, even in the case in which the circumscribed rectangles of the drawing objects overlap each other, this does not necessarily mean that the drawing objects overlap each other, but it is reasonable to make use of the coordinates of the circumscribed rectangle for the overlap determination from the viewpoint of the calculation cost. In the case in which the results of the determination at step S704 are affirmative, the processing advances to step S706 and on the other hand, in the case in which the results of the determination are negative, the processing advances to step S705.

In the case in which it is determined that there is no drawing object within the management list that overlaps the drawing object of interest (in the case of NO at step 704), another drawing object does not exist on the background side of the drawing object of interest that is a transparent object. In this case, at step S705, the image processing unit 162 performs alpha blending processing of the drawing object of interest and the white background, i.e., processing to combine each pixel of the drawing object of interest and the white pixel of the background. Hereinafter, the alpha blending processing of the transparent object and the white background is called "white blending processing". By the white blending processing at this step, the drawing object of interest is converted into a drawing object not having the alpha channel as color information, and, therefore, the number of channels of color information that the drawing object has decreases from four to three. Here, the pixel value of RGB in the combined image having 3-channel color information obtained by the alpha blending processing is represented by expression (1) below.

pixel value($R,G,B$) of combined image=pixel value ($R,G,B$) of foreground image×(100[%]−transparency [%] of foreground image)+pixel value($R,G,B$) of background×transparency [%] of foreground image                                                              expression (1).

As an example, the case is discussed in which the white blending processing is performed for the transparent image object 601 in the present embodiment. As described above, the transparent image object 601 that becomes a foreground consists of only the completely opaque (transparency 0%) black pixels and the completely transparent (transparency 100%) white pixels. Here, the pixel value (R, G, B, A) of the black pixel of the transparent image object 601 is represented as (0, 0, 0, 0), the pixel value (R, G, B, A) of the white pixel is represented as (255, 255, 255, 100), and the pixel value (R, G, B) of the background is represented as (255, 255, 255). In this case, by expression (1), the pixel value (R, G, B) of the black pixel of the combined image becomes (0, 0, 0) and the pixel value (R, G, B) of the white pixel of the combined image becomes (255, 255, 255). In this manner, the pixel value (4-channel) of the black pixel having a transparency of 0% in the transparent image object and the pixel value (4-channel) of the white pixel having a transparency of 100% are converted into the 3-channel pixel values, respectively.

On the other hand, in the case in which it is determined that there is a drawing object within the management list that overlaps the drawing object of interest (in the case of YES at step 704), another drawing object exists on the background side of the drawing object of interest that is a transparent object. In this case, the white blending processing is not performed. For example, in the case in which the drawing object of interest is the transparent image object 608, the graphics object 607 exists on the background side of the transparent image object 608, and, therefore, this corresponds to this case.

At step S706, the image processing unit 162 adds the drawing object of interest to the management list. Specifically, the identifier of the drawing object of interest and the coordinates of the circumscribed rectangle are newly described in the management list. Due to this, the drawing object of interest is managed from now on.

At step S707, the image processing unit 162 outputs the drawing data of the drawing object of interest to the PDL data creation unit 163. Next, the processing returns to step S701.

The above-described processing is the image processing accompanied by the white blending processing in the present embodiment. The processing in FIG. 7 is performed for each print page. The PDL data creation unit 163 creates PDL data based on the drawing data corresponding to each drawing object sequentially output from the image processing unit 162.

By the processing of the image processing unit 162 in the present embodiment, the transparent object that does not overlap another drawing object is converted into a drawing object with no alpha channel, and, therefore, the total number of transparent objects to be delivered to the PDL data creation unit 163 decreases. Consequently, the total number of transparent objects also decreases in the PDL data created by the PDL data creation unit 163, and, therefore, it is possible to reduce the processing load of the printer 20 and the amount of used memory in the case in which the PDL data is processed in the printer 20.

As described above, the processing to convert the drawing data of the transparent object into drawing data of a drawing object with no alpha channel in the case where there is no another drawing object on the background side of (behind) the transparent object is explained.

In the above-described explanation, the transparent object that becomes the foreground is supposed to be a transparent image object that draws a transparent image. It is also possible, however, to apply the present embodiment to another transparent object having the alpha channel as color information, and, for example, it is also possible to apply the present embodiment to the transparent object of a graphics or a character whose shape is described by vector data.

Further, in the above-described explanation, the case in which PDL data is created based on drawing data in the XPS format by using the V4 printer driver is explained, but it is also possible to apply the present embodiment to the V3 printer driver other than the V4 printer driver. Specifically, the case is considered in which the GDI application outputs a drawing command of a 4-channel (RGBA) object to the V3 printer driver, and in this case, it is possible to apply the present embodiment.

Second Embodiment

Figure 8:
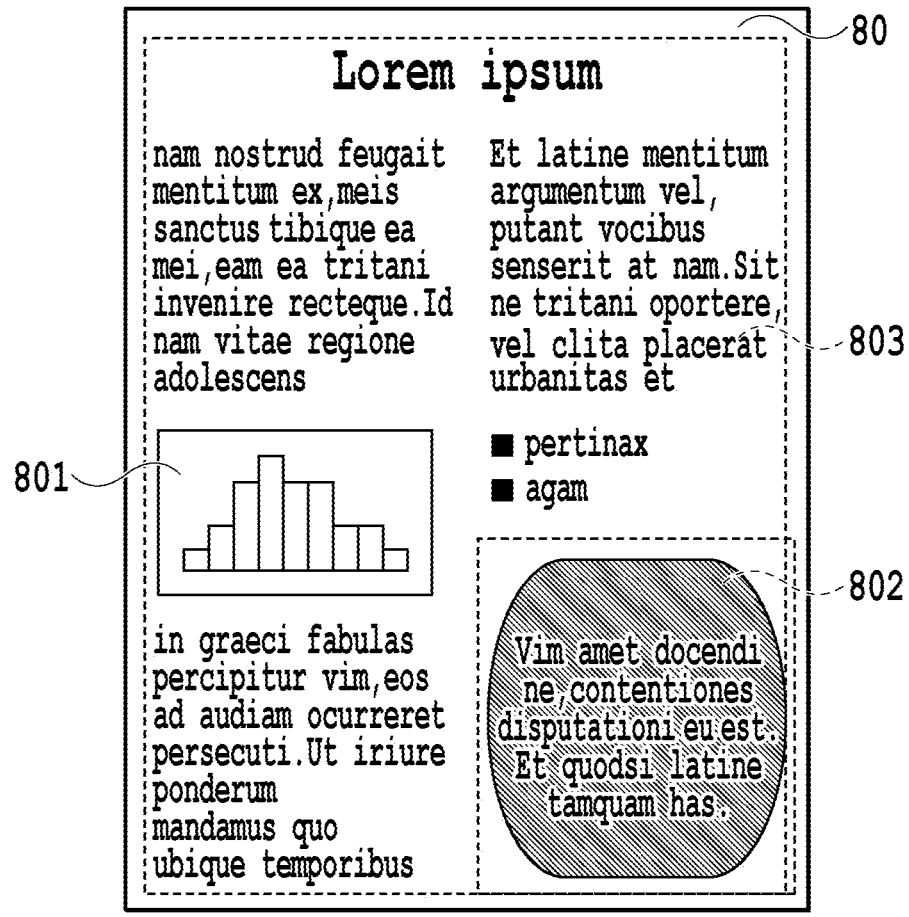
FIG. 8 is page data to which a second embodiment is applied.

In the first embodiment, as shown in FIG. 6B, the area of each transparent object that becomes a foreground occupies only part of the print page, and the area of each transparent object is small compared to that of the print page. The case is also supposed, however, in which the area of a transparent object that becomes a foreground occupies the majority of the print page (the area of the transparent object is large). FIG. 8 is a diagram showing an example of such a case.

Symbols 801 and 802 in FIG. 8 each indicate a graphics object, and symbol 803 indicates a transparent image object. That is, page data 80 includes the graphics object 801 that draws a graph, the graphics object 802 that draws a colored graphics, and the transparent image object 803. As shown in FIG. 8, the graphics object 801 and the graphics object 802 are arranged on the background and the transparent image object 803 whose area is substantially the same as that of the entire surface of the page is arranged in such a manner that the transparent image object 803 covers the graphics objects 801 and 802. In the case in which the first embodiment is applied to the page data shown in FIG. 8, another drawing object exists on the background side of the transparent image object 803, and, therefore, it is not possible to apply the white blending to the transparent image object 803. Because of this, in the present embodiment, the transparent image object is divided into small areas and, for each divided small area, it is determined whether the white blending processing can be performed, and, in the small area for which it is determined that the white blending processing can be performed, the white blending processing is performed. In the following description of the second embodiment, explanation of the same contents as those of the first embodiment is omitted.

Figure 9:
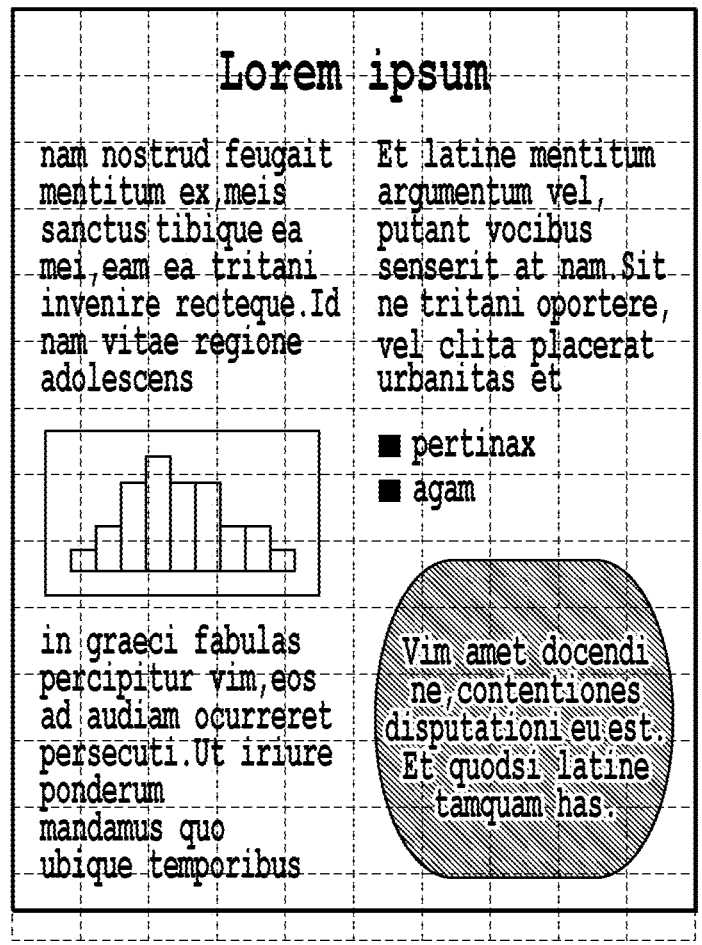
FIG. 9 is a schematic diagram of page data divided into blocks.

FIG. 9 is a schematic diagram of page data divided into blocks. Division-into-blocks processing in the present embodiment is processing to divide, for example, a transparent image object into small areas (blocks) of 256×256 pixels or the like. The present embodiment differs from the first embodiment in that the division-into-blocks processing is performed.

Block Blending Processing and Block Raster Operation Performing Processing

FIG. 10A and FIG. 10B are flowcharts showing a flow of processing in the present embodiment.

At step S1001, the image processing unit 162 determines whether there is an unprocessed drawing object among the drawing objects corresponding to the drawing data input from the XPS data analysis unit 151. In the case in which the results of the determination at step S1001 are affirmative, the processing advances to step S1002, and, on the other hand, in the case in which the results of the determination are negative, the series of processing ends.

At step S1002, the image processing unit 162 acquires information on the drawing object of interest.

At step S1003, the image processing unit 162 determines whether the drawing object of interest is a transparent object. In the case in which the results of the determination at step S1003 are affirmative, the processing advances to step S1004, and, on the other hand, in the case in which the results of the determination are negative, the processing advances to step S1016.

At step S1004, the image processing unit 162 searches the management list and determines whether there is a drawing object within the management list that overlaps the drawing object of interest. In the case in which the results of the determination at step S1004 are affirmative, the processing advances to step S1006, and, on the other hand, in the case in which the results of the determination are negative, the processing advances to step S1005.

At step S1005, the image processing unit 162 performs combination processing (white blending processing) of the drawing object of interest and the white background. As described above, the processing at step S1001 to step S1005 is the same as the processing at step S701 to step S705 shown in FIG. 7.

At step S1006, the image processing unit 162 performs the division-into-blocks processing to divide the drawing object of interest into small areas. The example of the division-into-blocks processing is as shown in FIG. 9.

At step S1007, the image processing unit 162 determines whether there is an unprocessed block. In the case in which the results of the determination at step S1007 are affirmative, the processing advances to step S1008, and, on the other hand, in the case in which the results of the determination are negative, the processing returns to step S1001.

Figure 11:
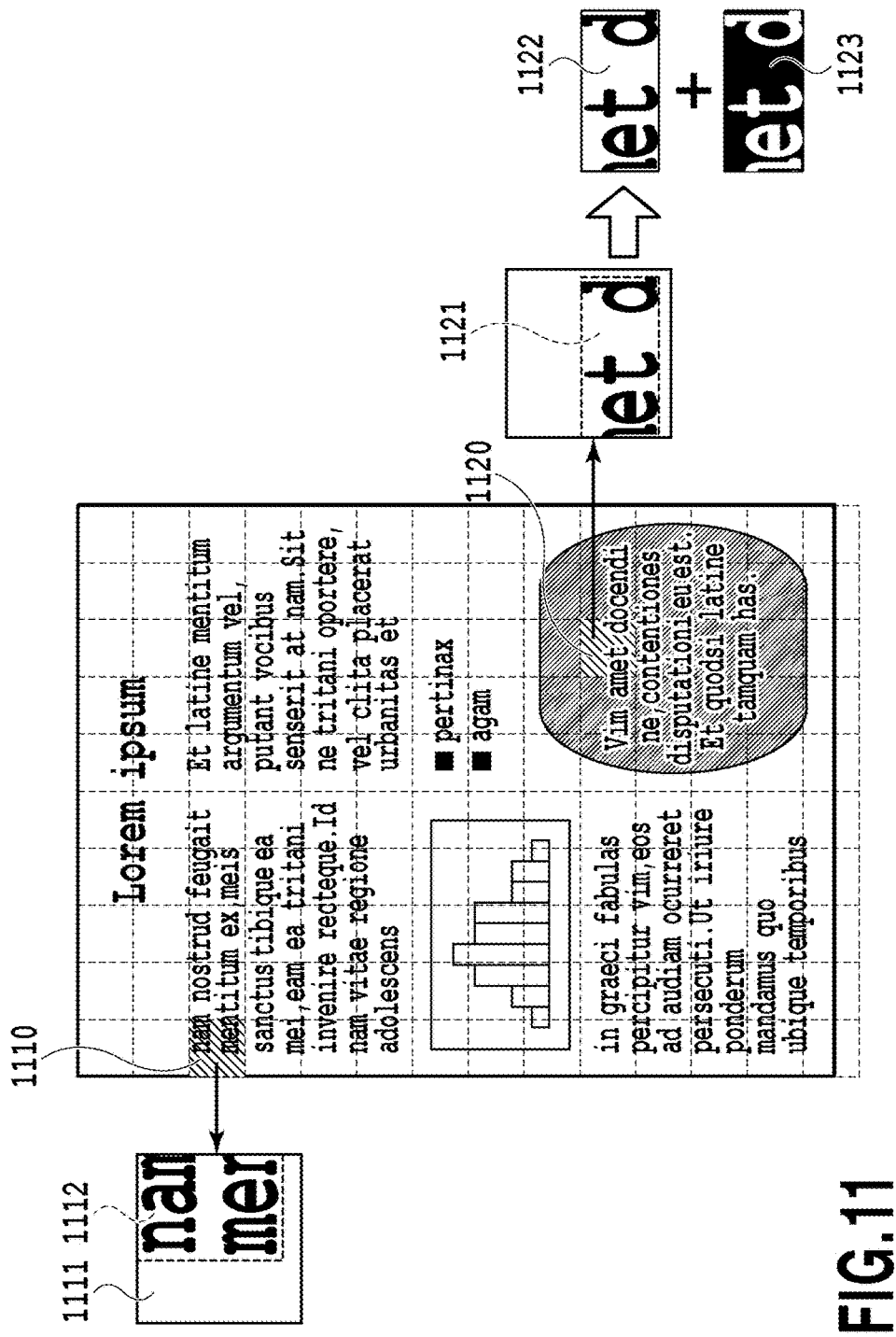
FIG. 11 is a schematic diagram explaining alpha trimming processing, block blending processing, and block raster operation performing processing (processing to perform a raster operation with respect to each block) in the second embodiment.

At step S1008, the image processing unit 162 acquires one of unprocessed blocks (hereinafter, called "block of interest") and performs alpha trimming processing for the block of interest. The alpha trimming processing is processing to cut off an area consisting of only pixels whose transparency is 100% from the block of interest, and to cut out a rectangular area including pixels whose transparency is not 100%. FIG. 11 shows the alpha trimming processing for a block 1110 as an example of the alpha trimming processing. As shown in FIG. 11, in the block 1110, the character image is arranged at the top-right and an area 1111 on the left side and the lower side on which no character image is arranged consists of only white pixels whose transparency is 100%. In the alpha trimming processing, by scanning one line each time from each of the upper, lower, left, and right sides of the block 1110, a rectangular area 1112 including pixels whose transparency is not 100% is specified and cut out. This rectangular area is specified so that the area is the minimum. Hereinafter, the image in the rectangular area cut out from the block of interest is called a "trimmed block". The trimmed block is part of the transparent object. At this step, information on the trimmed block (coordinates of each point, size, and so on) is also acquired.

At step S1009, the image processing unit 162 determines whether the area of the trimmed block is larger than zero. In the case in which the results of the determination at step S1009 are affirmative, the processing advances to step S1010, and, on the other hand, in the case in which the results of the determination are negative, the processing returns to step S1007 to process the next block.

At step S1010, the image processing unit 162 searches the management list and determines whether there is a drawing object within the management list that overlaps the trimmed block. In the case in which the results of the determination at step S1010 are negative, the processing advances to step S1011, and, on the other hand, in the case in which the results of the determination are affirmative, the processing advances to step S1012.

At step S1011, the image processing unit 162 performs the white blending processing for the trimmed block. Hereinafter, the white blending processing for the trimmed block is called "block blending processing".

At step S1012, the image processing unit 162 determines whether the pixels making up the trimmed block do not include a pixel except for the completely transparent (transparency 100%) pixels and the completely opaque (transparency 0%) pixels. In the case in which the results of the determination at step S1012 are affirmative, the processing advances to step S1013, and, on the other hand, in the case in which the results of the determination are negative, the processing advances to step S1014.

At step S1013, the image processing unit 162 performs the block raster operation performing processing for the trimmed block. Here, the block raster operation performing processing is explained by using FIG. 11. FIG. 11 shows the block raster operation performing processing for a block 1120 as an example of the block raster operation performing processing. In a trimmed block 1121 obtained by performing the alpha trimming processing for the block 1120, a graphics object that draws a colored graphics exists on the background side, and, therefore, it is not possible to apply the block blending. All the values of the alpha channels of the pixels making up the trimmed block 1121 are, however, one of the value indicating complete transparency (transparency 100%) and the value indicating complete opaqueness (transparency 0%) similar to the examples hitherto considered. The drawing command of the trimmed block 1121 such as this (part of the 4-channel transparent image object) can be replaced with the ROP drawing command to perform drawing by combining a 3-channel RGB image 1122 not including the alpha channel and a mask image 1123 that becomes auxiliary data. That is, by creating a mask image specifying a mask value 0 that specifies the use of the background at the position of the pixel whose transparency is 100% and a mask value 1 that specifies the use of the foreground at the position where the transparency is 0%, it is made possible to obtain the same printing results as the printing results based on the original transparent image object. The compression efficiency of the 3-channel RGB image created by the block raster operation performing processing is higher than that of the 4-channel RGBA image, and, therefore, it is possible to reduce the amount of used memory in the printer 20. Further, it is possible to process the ROP drawing command faster than the drawing command of the 4-channel trimmed block, and, therefore, it is possible to implement high-speed printing processing.

At step S1014, the image processing unit 162 adds the trimmed block to the management list (the identifier of the trimmed block and the coordinates of the circumscribed rectangle are described in the management list).

At step S1015, the image processing unit 162 outputs the drawing data of the trimmed block to the PDL data creation unit 163. Following this, the processing returns to step S1007 and the processing at step S1007 to step S1015 is repeated until there is no unprocessed block.

At step S1016, the image processing unit 162 adds the drawing object of interest to the management list. At step S1017, the image processing unit 162 outputs the drawing data of the drawing object of interest to the PDL data creation unit 163. Following this, the processing returns to step S1001. The processing at steps S1016 and S1017 is the same as the processing at step S706 and step 707 shown in FIG. 7.

The processing described above is the image processing accompanied by the block blending processing and the block raster operation performing processing in the present embodiment. By the present embodiment, in the case in which rendering processing is performed for page data having a transparent object whose area is large and that overlaps another drawing object, it is made possible to reduce the amount of memory used in the alpha blending processing and to implement high-speed printing processing.

Third Embodiment

In the second embodiment, in the case in which the trimmed block consists of only the completely opaque black pixels, the block raster operation performing processing for the trimmed block is performed (YES at step S1012 step→S1013). By this block raster operation performing processing, the drawing command of the 4-channel RGBA trimmed block is converted into the ROP drawing command to perform drawing by combining the 3-channel RGB image and the mask image. For the drawing command of the trimmed block consisting of only the completely opaque black pixels, however, higher efficiency is obtained at the time of performing raster image processing in the printer 20 by converting the drawing command into the drawing command of the 3-channel RGB image rather than converting the drawing command into the ROP drawing command.

Figure 12B:
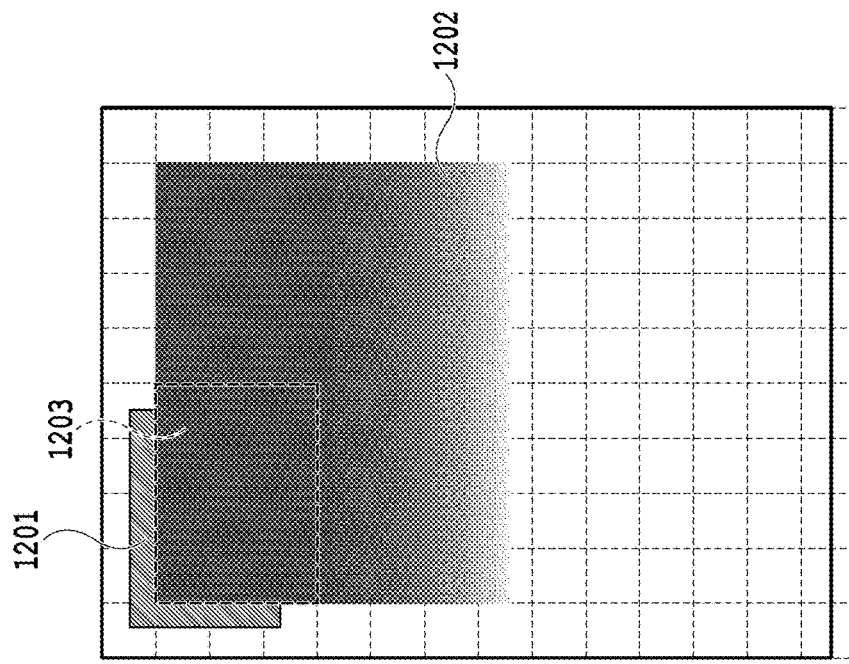
FIG. 12A and FIG. 12B are diagrams showing page data to which a third embodiment is applied.
Figure 12A:
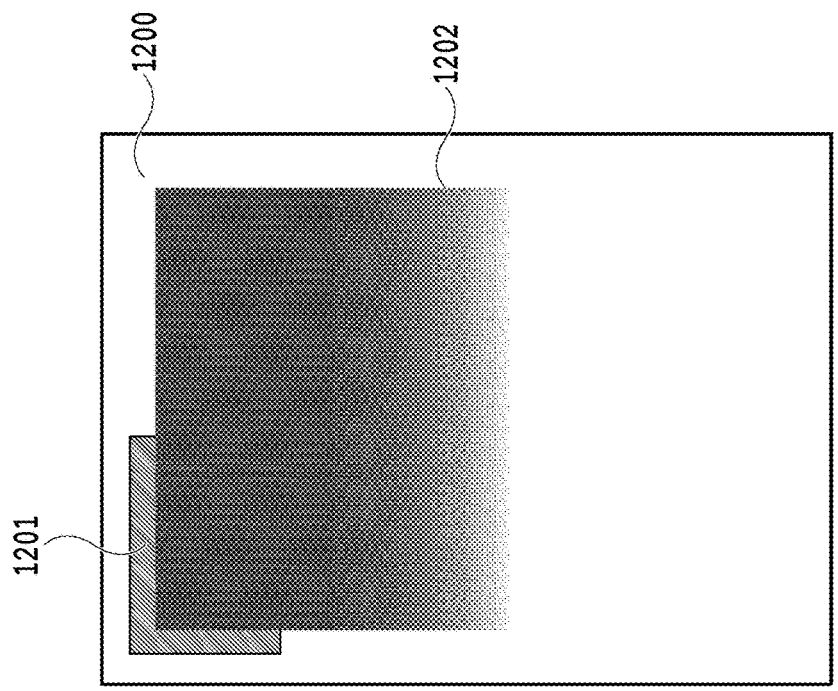

FIG. 12A is a diagram showing page data 1200 of a print page to which the present embodiment is applied, and the page data 1200 includes a graphic object 1201 and a transparent image object 1202 that is arranged thereon. As shown in FIG. 12A, the transparent image object 1202 is a gradation image that gradually changes from opaque to transparent. In the gradation image, the value of the alpha channel of each pixel changes gradually.

In the case in which the second embodiment is applied to the page data shown in FIG. 12A, because the graphics object 1201 exists on the background side of (behind) the transparent image object 1202, the division-into-blocks processing is performed for the transparent image object 1202 in place of the white blending processing. FIG. 12B is a schematic diagram of page data divided into blocks. After the division-into-blocks processing, for the block located in an area that does not overlap the graphics object 1201, the block blending processing is performed. On the other hand, for the block located in an area 1203 that overlaps the graphics object 1201, the block blending processing is not performed. Here, it is assumed that, in the area 1203, a change in gradation of a transparency is not seen and all the blocks located in the area 1203 consist of only the completely opaque (transparency 0%) pixels. In this case, in the second embodiment, for the block located in the area 1203, in place of the block blending processing, the block raster operation performing processing is performed. In the present embodiment, the drawing command of the block such as this consisting of only the completely opaque pixels is converted into a drawing command of a 3-channel RGB image that enables higher-speed processing in place of a ROP drawing command. This conversion is equivalent to conversion from a 4-channel RGBA block into a 3-channel RGB block and this processing is called "conversion-into-RGB block processing".

Conversion-into-RGB Block Processing

Figure 13:
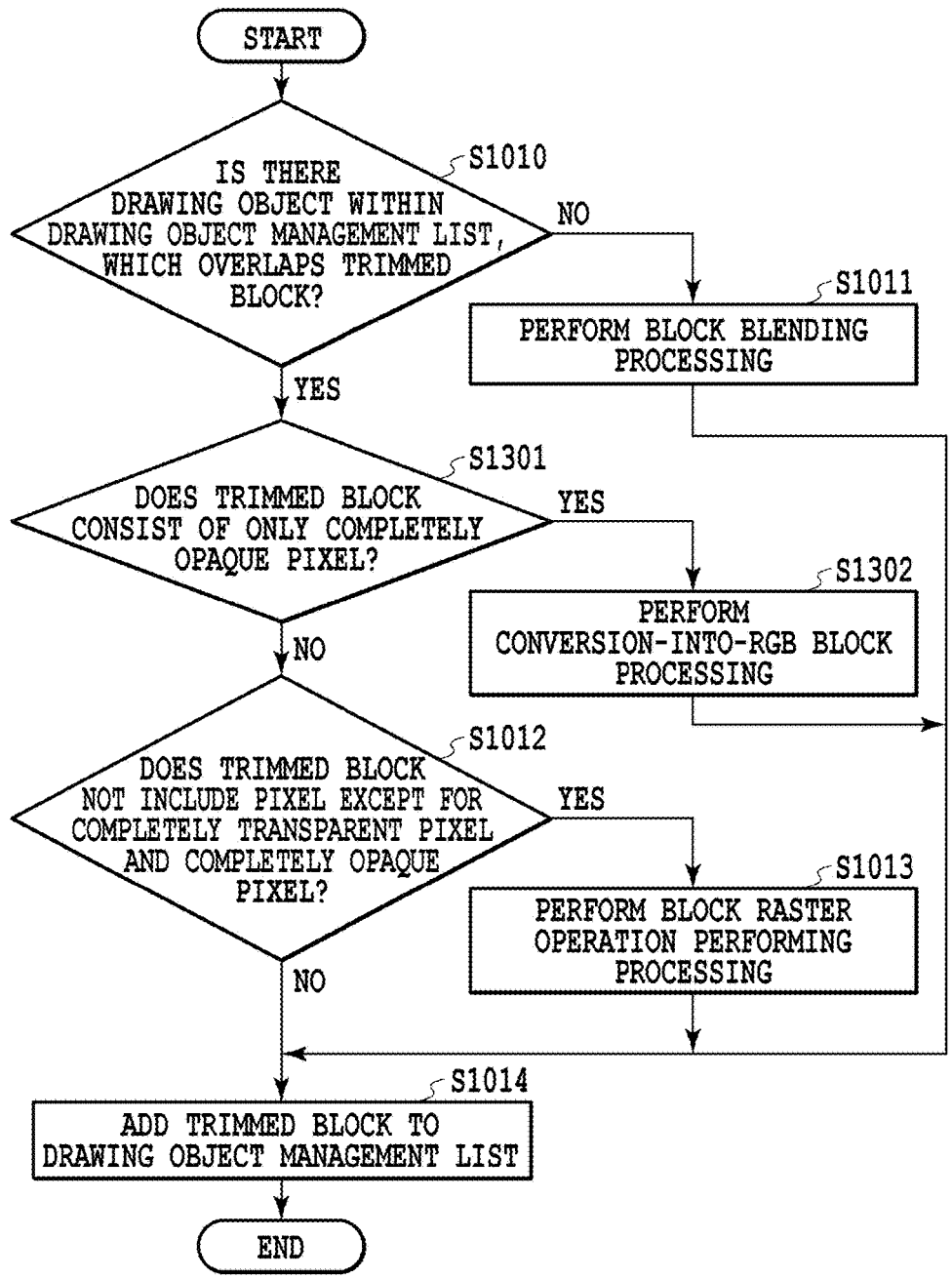
FIG. 13 is a flowchart showing a flow of processing in the third embodiment.

FIG. 13 is a flowchart showing a flow of processing in the present embodiment. In FIG. 13, however, processing added to the flow of the second embodiment is excerpted and shown.

As shown in FIG. 13, in the present embodiment, in the case in which YES is determined at step S1010, the processing advances to step S1301. At step S1301, the image processing unit 162 determines whether the trimmed block consists of only the completely opaque (transparency 0%) pixels. At this step, it is determined whether it is possible to convert the drawing command of the trimmed block that is part of a 4-channel transparent image object into the drawing command of a 3-channel RGB image in place of the ROP drawing command. In the case in which the results of the determination at step S1301 are affirmative, the processing advances to step S1302, and, on the other hand, in the case in which the results of the determination are negative, the processing advances to step S1012.

At step S1302, the image processing unit 162 converts the trimmed block that is part of a 4-channel transparent image object into a 3-channel image object by deleting the alpha channel from the color information on the trimmed block. This conversion processing is the above-described conversion-into-RGB block processing. Next, the processing advances to step S1014.

The processing described above is the image processing accompanied by the conversion-into-RGB block processing in the present embodiment.

Fourth Embodiment

In the first embodiment, the case is explained in which whether or not the white blending processing is performed is determined for all the drawing objects existing within page data of a print page, and the white blending processing is performed in accordance with the results of the determination. As described above, at the time of performing the white blending processing for a certain drawing object of interest, the processing to determine whether the drawing object overlaps the drawing object of interest is performed for all the drawing objects registered in the management list (step S704). Consequently, in the case in which a large number of drawing objects exist within page data, the number of drawing objects registered in the management list becomes large, and, therefore, there is a possibility that much time is taken for the overlap determination processing. In the present embodiment, control is performed so that the white blending processing is not performed in accordance with the number of objects (specifically, in the case in which the number of objects registered in the management list is larger than or equal to a predetermined threshold value).

Figure 15:
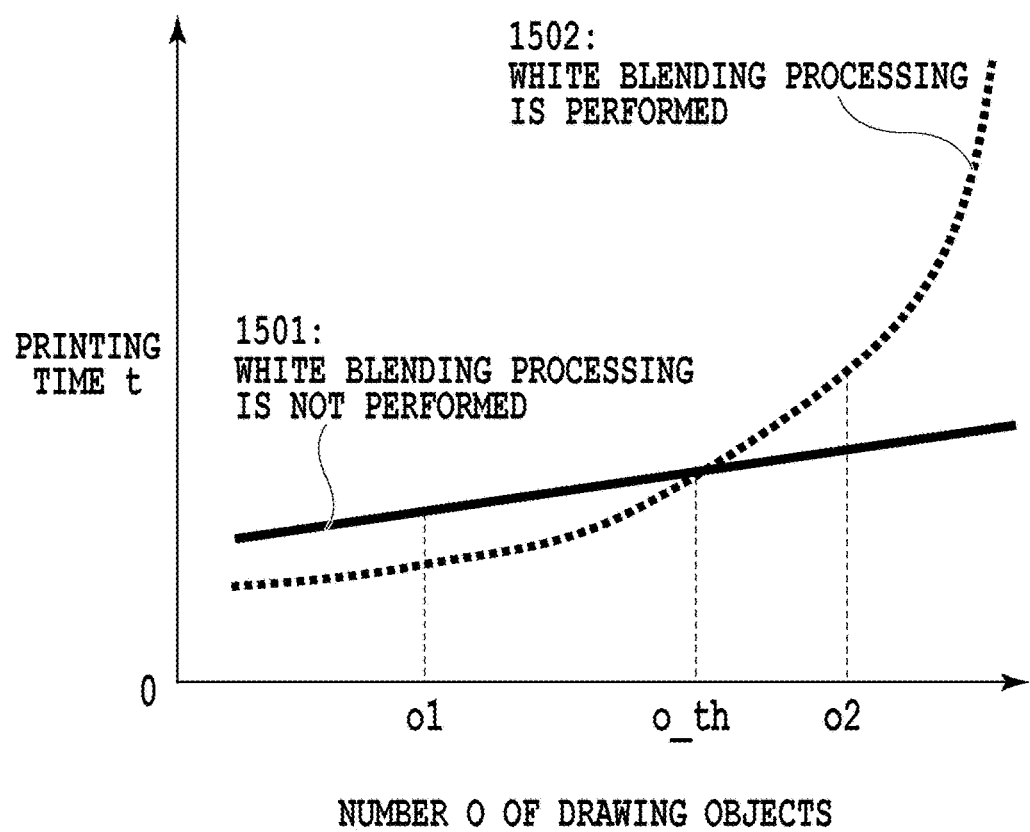
FIG. 15 is a graph representing a relationship between a number O of drawing objects and a printing time tin the fourth embodiment.

FIG. 15 is a graph representing how a printing time t changes accompanying a change in a number O of drawing objects existing within page data. Here, it is assumed that the printing time t is the sum of the processing time in the V4 printer driver 13 and the processing time in the printer 20. Symbol 1501 in FIG. 15 indicates a relationship between the number of drawing objects within page data and the printing time in the case where printing processing is performed without performing the white blending processing at all. Further, symbol 1502 indicates a relationship between the number of drawing objects with page data and the printing time in the case in which the white blending processing is performed for all the drawing objects. In the example shown in FIG. 15, in the case in which the number O of drawing objects is smaller than a threshold value o_th, the printing time becomes shorter on the occasion that the white blending processing is performed than that on the occasion that the white blending processing is not performed. Further, in the case in which the number O of drawing objects is larger than the threshold value o_th, the printing time becomes shorter on the occasion that the white blending processing is not performed than that on the occasion that the white blending processing is performed.

Figure 16A:
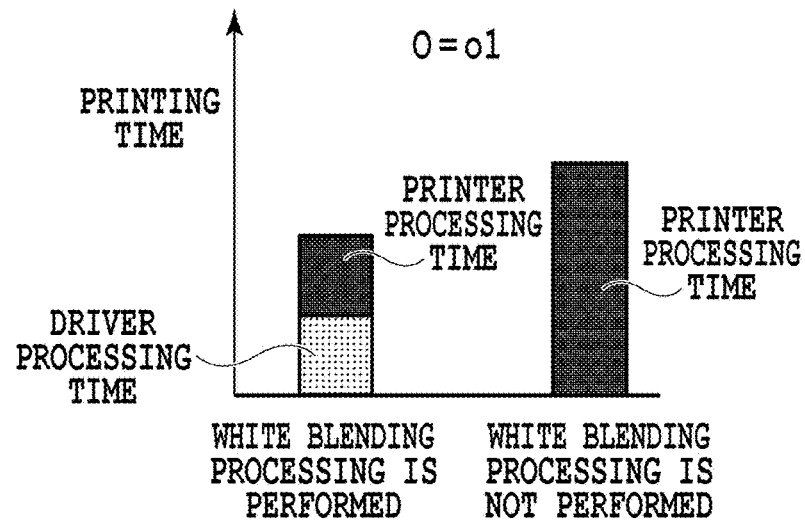
FIG. 16A and FIG. 16B are diagrams explaining an effect by the fourth embodiment.
Figure 16B:
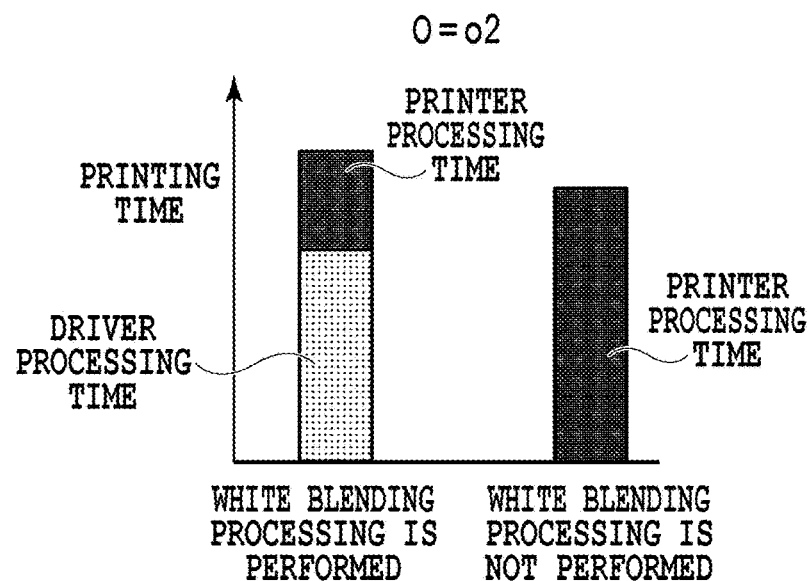

FIG. 16A shows a detailed breakdown image graph of the printing times by the V4 printer driver 13 and the printer 20 in the case in which O=o1 and FIG. 16B shows that in the case where O=o2.

First, the case in which O=o1 (FIG. 16A) is discussed. In this case, the printing time on the occasion that the white blending processing is performed (the sum of the processing time of the V4 printer driver 13 and the processing time of the printer 20) is shorter than the printing time on the occasion that the white blending processing is not performed (the processing time of the printer 20 alone). Consequently, in the case in which O=o1, the printing time is shorter on the occasion that the white blending processing is performed than that on the occasion that the white blending processing is not performed.

Next, the case in which O=o2 (FIG. 16B) is discussed. In this case, the printing time on the occasion that the white blending processing is performed (the sum of the processing time of the V4 printer driver 13 and the processing time of the printer 20) is longer than the printing time on the occasion that the white blending processing is not performed (the processing time of the printer 20 alone). The reason is that the overlap determination processing takes much time. Consequently, in the case in which O=o2, the printing time is shorter on the occasion that the white blending processing is not performed than that on the occasion that the white blending processing is performed.

As described above, depending on the number of drawing objects for which the overlap determination is performed, there is a case in which the printing time that is the sum of the processing time of the V4 printer driver 13 and the processing time of the printer 20 is shorter on the occasion that the white blending processing is not performed than that on the occasion that the white blending processing is performed.

Figure 14:
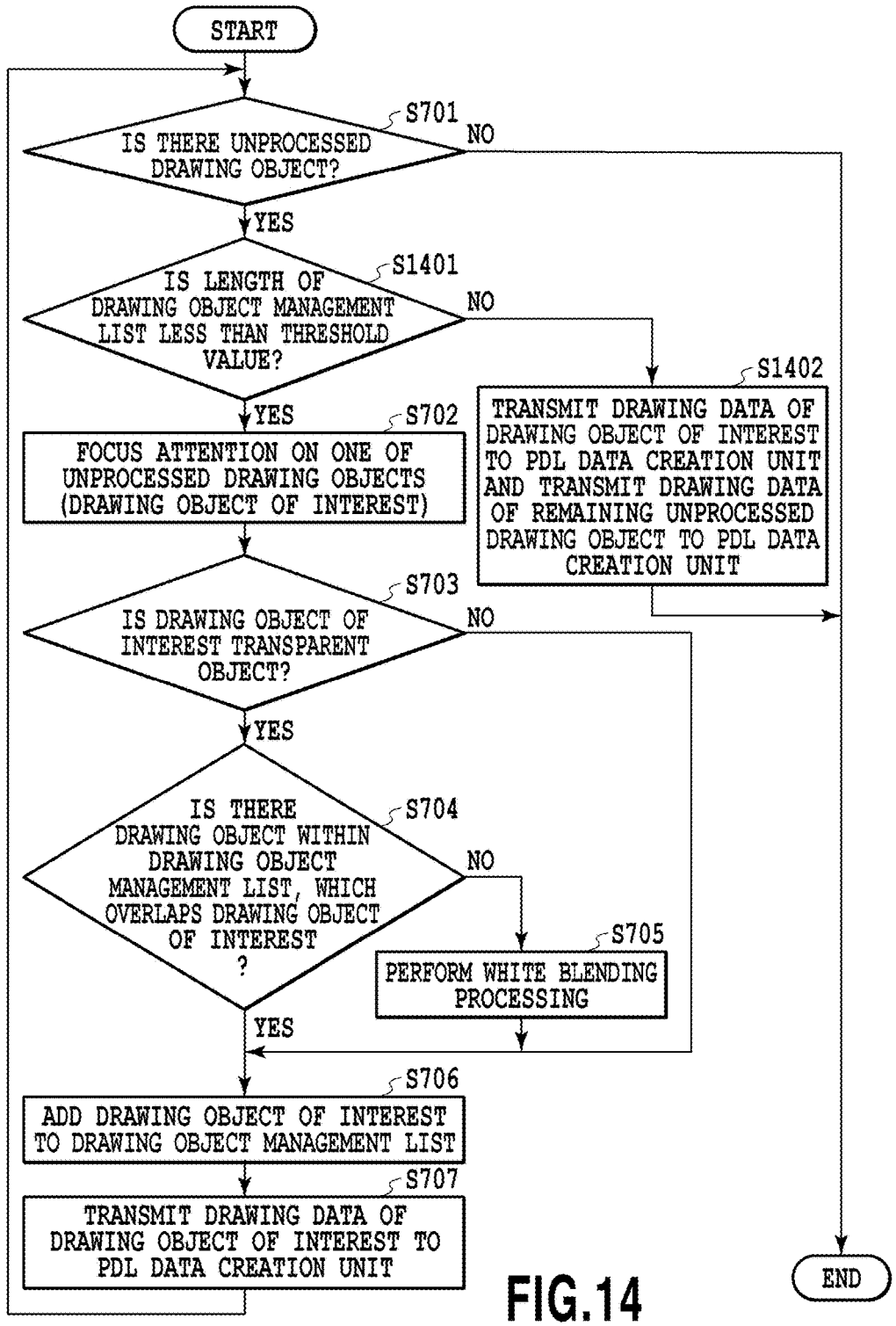
FIG. 14 is a flowchart showing a flow of processing in a fourth embodiment.

In the following description, the series of processing, including processing to determine whether or not to perform the white blending processing in accordance with the number of drawing objects registered in the management list, is explained by using FIG. 14. FIG. 14 is created based on the flowchart (FIG. 7) of the first embodiment, and, therefore, explanation of the same contents as those of the first embodiment is omitted appropriately.

In the present embodiment, in the case in which it is determined that there is an unprocessed drawing object at step S701 (in the case of YES at step S701), the processing advances to step S1401.

At step S1401, the image processing unit 162 functions as a drawing object number determination unit and determines whether the length of the drawing object management list, i.e., the number of drawing objects already registered in the management list is less than a threshold value. In the case in which the results of the determination at step S1401 are affirmative, the processing advances to step S702 as in the first embodiment, and the same processing as that of the first embodiment is performed at the subsequent steps S702 to S707. On the other hand, in the case in which the results of S1401 are negative, it is determined that the printing time is lengthened in the case in which the overlap determination is performed further, and the processing advances to step S1402. Then, at step S1402, the image processing unit 162 transmits the drawing data of the drawing object of interest to the PDL data creation unit 163 as it is. Further, for the unprocessed drawing object except for the drawing object of interest, the image processing unit 162 similarly transmits the drawing data of the drawing object to the PDL data creation unit 163 as it is.

As described above, it is possible to shorten the printing time by not performing the overlap determination in accordance with the number of objects within page data.

As the threshold value that is used at step S1401, it is necessary to derive the number of drawing objects that reverses the relationship in magnitude between the printing time in the case in which the white blending processing is performed and the printing time in the case in which the white blending processing is not performed, such as the above-described threshold value o_th. In derivation of such a threshold value, it is sufficient to calculate an optimum value based on the relationship between the specifications of the printer 20, the PC 10, and so on, that is used, and the number of drawing objects. Here, the case in which the present embodiment is applied to the first embodiment is explained, but it is also possible to apply the present embodiment to the second embodiment and the third embodiment.

In the first to fourth embodiments, the configuration is designed so that the processing load in the printer 20 is reduced by the PC 10 converting part of drawing data of a transparent object into drawing data of a drawing object with no alpha channel. It may also be possible, however, to design a configuration in which the processing to convert part of drawing data of a transparent object into drawing data of a drawing object with no alpha channel is performed not by the PC 10 but by the printer 20 as preprocessing before raster image processing is performed. By designing a configuration as described above, it is possible to reduce the load in the printer 20 at the time of raster image processing.

OTHER EMBODIMENTS

Embodiments of the present invention can also be realized by a computer of a system or an apparatus that reads out and executes computer executable instructions (e.g., one or more programs) recorded on a storage medium (that may also be referred to more fully as a "non-transitory computer-readable storage medium") to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

By the present invention, the amount of used memory necessary for the alpha blending processing in a printer is reduced and high-speed printing processing is enabled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
(A) a memory that stores a printer driver; and
(B) a processor that is connected to the memory and that executes the printer driver to perform the steps of:
  (a) determining, in a case in which a drawing object making up page data of a print job is a transparent object having an alpha channel as color information, whether the transparent object overlaps another drawing object;
  (b) converting, in a case in which it is determined that the transparent object does not overlap the other drawing object, drawing data of the transparent object into drawing data of a drawing object not having an alpha channel as color information, wherein, in a case in which it is determined that the transparent object overlaps the other drawing object, the drawing data of the transparent object is not converted into the drawing data of the drawing object not having the alpha channel as color information; and
  (c) creating, based on the converted drawing data of the transparent object that does not overlap the other drawing object, and based on the drawing data of the transparent object that has not been converted in the converting step, Page Description Language (PDL) data to be output to an image forming apparatus.

2. The information processing apparatus according to claim 1, wherein the processor executes the printer driver to further perform the step of (d) determining whether the drawing object is the transparent object.

3. The information processing apparatus according to claim 1, wherein the processor converts the drawing data of the transparent object into the drawing data of the drawing object not having the alpha channel as color information by performing alpha blending processing of the transparent object and a white background.

4. The information processing apparatus according to claim 1, further comprising (C) a storage unit configured to store a list holding information on a drawing object making up the page data, wherein the processor determines whether the transparent object overlaps the other drawing object by using the list.

5. The information processing apparatus according to claim 4, wherein the information on the drawing object held in the list is information on coordinates of a circumscribed rectangle of the drawing object making up the page data, and the processor determines whether the transparent object overlaps the other drawing object based on coordinates of a circumscribed rectangle of the transparent object and the coordinates of the circumscribed rectangle of the drawing object held in the list.

6. The information processing apparatus according to claim 4, wherein the processor executes the printer driver to further perform the step of (d) determining whether a number of drawing objects registered in the list is less than a threshold value.

7. The information processing apparatus according to claim 6, wherein, in a case in which it is determined that the number of drawing objects registered in the list is not less than the threshold value, the steps of determining whether the transparent object overlaps the other drawing object, and of converting the drawing data of the transparent object into the drawing data of the drawing object not having the alpha channel as color information are not performed.

8. The information processing apparatus according to claim 6, wherein the threshold value is derived based on specifications of the information processing apparatus and specifications of the image forming apparatus.

9. The information processing apparatus according to claim 1, wherein the processor executes the printer driver to further perform the steps of:
(d) dividing the transparent object into a plurality of blocks in the case in which it is determined that the transparent object overlaps the other drawing object;
(e) cutting out a trimmed block that is a minimum rectangular area including a pixel not completely transparent by cutting off an area consisting of only completely transparent pixels for each of the plurality of divided blocks; and
(f) performing block blending processing that is alpha blending processing of the trimmed block and a white background.

10. The information processing apparatus according to claim 9, wherein the processor executes the printer driver to further perform the step of (g) converting, in a case in which the trimmed block does not include a pixel except for a completely transparent pixel and a completely opaque pixel, a drawing command of the trimmed block into a Raster Operation (ROP) drawing command to perform drawing by combining an image not having the alpha channel as color information and a mask image.

11. The information processing apparatus according to claim 10, wherein, in the mask image, a mask value at a position corresponding to the completely transparent pixel of the trimmed block is a value indicating use of a background, and a mask value at a position corresponding to the completely opaque pixel of the trimmed block is a value indicating use of a foreground.

12. The information processing apparatus according to claim 9, wherein the processor executes the printer driver to further perform the step of (g) removing the alpha channel from color information on the trimmed block in a case in which the trimmed block consists of only completely opaque pixels.

13. An information processing method performed by a processor, the method comprising:

determining, in a case in which a drawing object making up page data of a print job is a transparent object having an alpha channel as color information, whether the transparent object overlaps another drawing object;
converting, in a case in which it is determined that the transparent object does not overlap the other drawing object, drawing data of the transparent object into drawing data of a drawing object not having an alpha channel as color information, and, in a case in which it is determined that the transparent object overlaps the other drawing object, the drawing data of the transparent object is not converted into the drawing data of the drawing object not having the alpha channel as color information; and
creating, based on the converted drawing data of the transparent object that does not overlap the other drawing object, and based on the drawing data of the transparent object that has not been converted in the converting step, Page Description Language (PDL) data to be output to an image forming apparatus.

14. A non-transitory computer readable storage medium storing a program for causing a computer to perform the steps of:
determining, in a case in which a drawing object making up page data of a print job is a transparent object having an alpha channel as color information, whether the transparent object overlaps another drawing object;
converting, in a case in which it is determined that the transparent object does not overlap the other drawing object, drawing data of the transparent object into drawing data of a drawing object not having an alpha channel as color information, wherein, in a case in which it is determined that the transparent object overlaps the other drawing object, the drawing data of the transparent object is not converted into the drawing data of the drawing object not having the alpha channel as color information; and
creating, based on the converted drawing data of the transparent object that does not overlap the other drawing object, and based on the drawing data of the transparent object that has not been converted in the converting step, Page Description Language (PDL) data to be output to an image forming apparatus.

15. A non-transitory computer readable storage medium storing a program for causing a computer to perform the steps of:
determining whether a number of drawing objects making up page data of a print job is less than a threshold value;
determining, in a case in which the number of the drawing objects making up the page data of the print job is less than the threshold value and a drawing object making up the page data of the print job is a transparent object, whether the transparent object overlaps another drawing object;
converting, in a case in which it is determined that the transparent object does not overlap the other drawing object, drawing data of the transparent object into drawing data of a drawing object not having an alpha channel as color information, wherein, in a case in which it is determined that the transparent object overlaps the other drawing object, the drawing data of the transparent object is not converted into the drawing data of the drawing object not having the alpha channel as color information; and
creating, based on the converted drawing data of the transparent object that does not overlap the other drawing object, and based on the drawing data of the transparent object that has not been converted in the converting step, Page Description Language (PDL) data to be output to an image forming apparatus, wherein, in a case in which it is determined that the number of the drawing objects making up the page data of the print job is not less than the threshold value, the PDL data is created based on the non-converted drawing data without performing the step of determining whether the transparent object overlaps the other drawing object.

* * * * *